United States Patent [19]
Price

[11] Patent Number: 6,114,835
[45] Date of Patent: Sep. 5, 2000

[54] MULTI-CELL BATTERY PACK CHARGE BALANCING CIRCUIT

[75] Inventor: Burt L. Price, Apex, N.C.

[73] Assignee: Unitrode Corporation, Merrimack, N.H.

[21] Appl. No.: 09/360,746

[22] Filed: Jul. 26, 1999

[51] Int. Cl.[7] .................................................. H02J 7/00
[52] U.S. Cl. ............................................................. 320/118
[58] Field of Search .................................... 320/118, 119

[56] References Cited

U.S. PATENT DOCUMENTS

| | | | |
|---|---|---|---|
| 4,053,824 | 10/1977 | Dupuis et al. | 320/118 |
| 5,578,914 | 11/1996 | Morita | 320/118 |
| 6,043,628 | 1/2000 | Perelle et al. | 320/119 |

*Primary Examiner*—Peter S. Wong
*Assistant Examiner*—Pia Tibbits
*Attorney, Agent, or Firm*—Weingarten, Schurgin, Gagnebin & Hayes LLP

[57] ABSTRACT

A charge balancing circuit incorporates a voltage threshold which determines when to initiate a charge balance mode in order to equalize the level of charge in at least two cells of a multi-cell battery pack. Charge balancing is initiated when the voltage level of a first cell reaches this second threshold. Charge balancing then continues by modifying the charges of the first balance cell and a second reference lesser charged cell until the voltage levels of the first and second cells are equal. A subsequent charge cycle will result in the cell with the greatest charge being balanced with another of lesser charge. In this manner, all of the cells of a multi-cell battery pack are charge balanced over the course of plural charge cycles.

25 Claims, 9 Drawing Sheets

MULTI-CELL BATTERY PACK CHARGE BALANCING CIRCUIT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Rechargeable batteries for use with electronic devices such as laptop PCs are often provided in a pack of battery cells. The use of a pack of cells, rather than a single cell, can provide higher voltage delivery or a greater capacity through increased amp-hours. Individual cells included in such a pack, however, have a tendency to accept a charge at different rates. Over a series of charge cycles, an individual cell can deviate significantly from the charge capacity of other cells in the pack.

Certain cell types, such as lithium-ion cells, can also be hazardous if an attempt is made to charge them significantly above or below their normal charge range. For this reason, charge boundary protective circuitry must be included in such packs to guard against this type of condition. Since, however, all cells in a pack are charged and drained simultaneously, such circuitry tends to stop charging before all cells have a full charge, and tends to stop discharging a pack before all cells are fully discharged.

A typical charger protection circuit employs four threshold voltage values which serve to keep the cells charged within a safe range. An over-voltage threshold V(ov) sets the maximum allowable charge for a cell, at which point the protection circuit will prevent further charging. An under-voltage threshold V(uv) sets the minimum charge which a cell may not fall below, at which point no current is allowed to flow. An over-voltage-to-normal V(ovn) threshold is slightly below the over-voltage threshold, and is used to set a protection circuit state machine to provide hysteresis in transitioning between various states in the charge cycle. An under-voltage-to-normal threshold V(uvn) is slightly above the under-voltage threshold, and is likewise used to set a state machine.

Therefore, during charging of the pack, the first cell to reach V(ov) stops charging of all cells, and sets the state machine such that the protection circuit will not allow further charging until all cells fall below V(ovn). In other words, the cell must discharge by a predetermined amount set by V(ovn) until further charging will be permitted. Similarly, the first cell to discharge down to V(uv) will shut off the pack, and sets the state machine such that no current will be permitted to flow until all cells are above V(uvn), and thus further discharge will be prevented until the cells are charged by a certain level set by V(uvn).

Further, the chargeable material in many rechargeable cells undergoes a conditioning in the first few charge cycles. Such conditioning preferably entails several full charge and discharge cycles to utilize all chargeable (charge retaining) material of the cell. The level of charge achieved by this conditioning tends to affect the long term ability of the chargeable material to accept and sustain a charge. Therefore, a less than full charge or less than full discharge can cause the cell to be permanently attributed this lesser charge capacity range.

As indicated above, a typical prior art protection circuit turns off pack charging when any cell in a pack attains the overvoltage threshold V(ov) and turns off pack discharge by shutting down the pack after the first cell has discharged down to the undervoltage threshold V(uv). This type of circuit results in possibly only one cell being fully charged, and only one cell being fully discharged, in each cycle. Therefore, the most deviant cells tend to dictate the performance of the pack as a whole. In a pack with a large number of cells, cells with an intermediate charge capacity are likely to never be fully charged or discharged, as a stronger or weaker cell triggers the charging limits first. As a result, such cells will not become conditioned for an optimal charging capacity.

For these reasons, such multi-cell battery packs could benefit from a charge balancing circuit. Such a circuit would attempt to selectively turn off cells which have reached full voltage during the charging process, while allowing others which have not yet attained full potential to continue charging.

These charge balancing circuits attempt to balance the charge by individually monitoring the voltage of each cell, rather than by using the first cell to reach V(ovn) and V(uvn) as the charge start/stop triggers. Such circuits, however, tend to require a quantity of cell specific components to individually monitor and control the charge level of each cell. As a result, the complexity and number of components rises proportionally with the number of cells, increasing production and maintenance costs of the pack.

It would be beneficial to devise a charge balancing circuit with a minimal set of components which can be applied to a plurality of cells in a pack.

BRIEF SUMMARY OF THE INVENTION

A charge balancing circuit incorporates two voltage thresholds, one of which may be the same as the V(ovn) threshold, which determine when to initiate a charge balance mode in order to equalize the level of charge in at least two cells of a multi-cell battery pack. Charge balancing is initiated when the voltage level of a first cell reaches this threshold. Charge balancing then continues by modifying the charges of the first cell and a second lesser charged cell until the voltage levels of the first and second cells are equal. A subsequent charge cycle will result in the cell with the greatest voltage being balanced with another of lesser voltage. In this manner, all of the cells of a multi-cell battery pack are charge balanced over the course of plural charge cycles.

As a charge cycle is initiated, all cells in a pack have a voltage level below a full charge threshold known as the over-voltage-to-normal V(ovn) threshold. When the battery pack is placed in a charger, all cells do not necessarily have exactly the same cell voltage levels. Charging gradually increases the voltage level of each cell. As the cells charge at slightly different rates, some cells will progress to higher voltages than others over a given period of time. Consequently, voltage levels of some cells will cross the V(ovn) threshold before others do. Charge balancing is initiated when one of the cells attains a voltage equal to the threshold voltage level described above, known as the equalization threshold V(eq). The charge balancing circuit then determines a charge balancing reference cell from among cells which have not yet crossed V(ovn). The voltage of the reference cell is used to determine the limits of the charge balancing operation. If multiple cells remain below V(ovn), one is selected as a reference cell by a cell balance selection circuit, which selects such a reference cell by various methods as described below. If no cells are below V(ovn), the pack is deemed balanced and no balancing occurs for that charge cycle. Otherwise, charge balancing occurs between the balance cell and the reference cell by modifying the charge of these cells until their voltage levels are equal. Such modification is performed by either maintaining or discharging the balance cell, or by continuing to charge the reference cell, along with the other cells in the pack.

Therefore, at the end of a charge balance cycle both the balance cell and the reference cell will have the same voltage. The next charge cycle results in the cell with the greatest charge being balanced with another of lesser charge. In this manner, a finite number of charge cycles, depending on the number of cells and the cell balance selection logic, will result in balancing of the entire pack.

BRIEF DESCRIPTION OF THE SEVERAL VIEWS OF THE DRAWING

The invention will be more fully understood in view of the Detailed Description of the Invention, and the Drawing, of which:

FIG. 5b is a schematic of the cell sampling logic as used in the circuit of FIG. 5a;

FIG. 5c is a schematic of the comparator logic as used in the circuit of FIG. 5a;

FIG. 5d is a schematic of the shift register logic as used in the circuit of FIG. 5a;

DETAILED DESCRIPTION OF THE INVENTION

Charge balancing of a multi-cell pack as described herein is performed by monitoring and manipulating voltages of the individual cells according to the voltage levels depicted in FIGS. 1a–3d. During a charging cycle, the charge of all cells gradually increases. Charge balancing equalizes the charge of the cell having the greatest charge, and modifies the charge such that it becomes equal to a cell having a lesser charge. Over several charge cycles, the voltage level of the entire pack will tend to converge to the same voltage level.

Charge balancing involves identifying a reference cell and a balance cell. The balance cell will either be discharged or maintained at its present voltage, while the reference cell and other cells may continue to be charged.

When the voltage levels of the balance cell and the reference cell are equal, the charge balance cycle is complete. Therefore, the balance cell voltage, as it maintains or drops in voltage, will become equal to the reference cell voltage as it increases.

As described above, overvoltage-to-normal threshold V(ovn) 10 is used to set a protection circuit state machine to define the threshold for permitting recharging following partial discharge. Overvoltage threshold V(ov) 12 is the maximum allowed safe voltage for a cell. V(eq) 14 sets the threshold at which charge balancing is initiated. FIG. 1a shows the voltage level of the four cells prior to charging. All of cells 1–4 must be below V(ovn) to enable charge balancing during a charge cycle. Such enabling of charge balancing insures that charge balancing will only be initiated when the pack is in a charger.

During charging, as shown in FIG. 1b, the voltage level of all cells rises. The first cell to cross V(eq) 14 will cause charge balancing to be initiated. Referring to FIG. 1c, cell 4 crosses V(eq), causing a charge balancing cycle to be initiated. The charge balancing cycle initiates selection of a cell with a lesser charge, preferable one which has not yet crossed the V(ovn) threshold, as a reference cell for balancing with balance cell 4. As cell 1 is the only cell to remain below V(ovn), cell selection logic selects cell 1 as the reference cell. If multiple cells have not yet crossed V(ovn), then cell selection logic (described further below) chooses one cell as the reference cell. If no cell is below V(ovn) when a cell crosses V(eq), no charge balancing occurs.

As shown in FIG. 1d, cell balancing causes balance cell 4 to be discharged or maintained until equal in voltage to reference cell 1, as shown by dotted line 26. During balancing, other cells in the pack cell 2, cell 3 continue to charge along with cell 1, and hence are approaching or even slightly exceeding V(eq) by the end of the charge balancing cycle. As indicated above, however, if any cell attains the charge level defined by V(ov), charging is terminated. Charge balancing, however, will continue until the balance and reference cells are balance, irrespective of charging.

Figure 1:
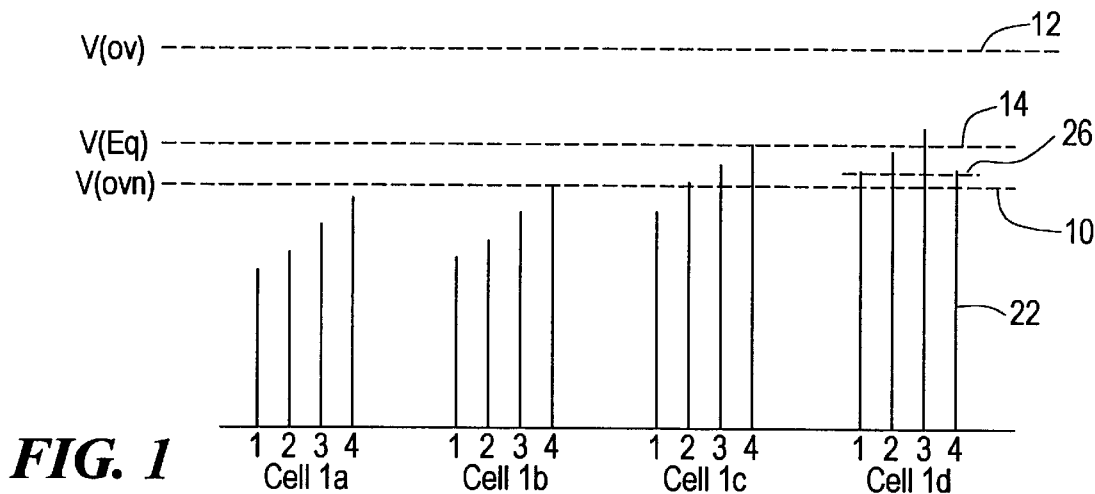
FIG. 1a–1d shows pack cell voltage during a charge cycle according to the present invention.
Figure 2:
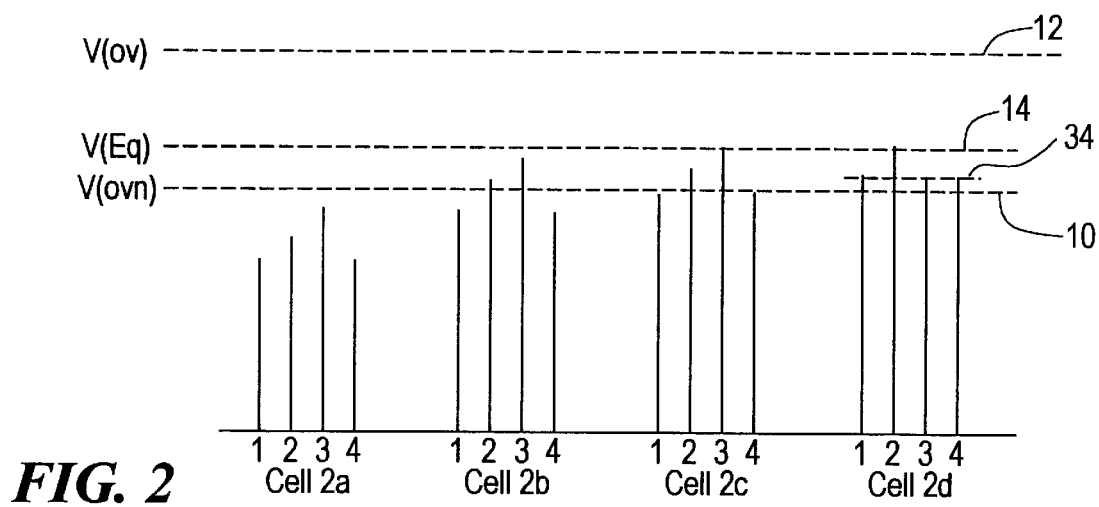
FIG. 2a–2d shows pack cell voltage during a charge cycle subsequent to that of FIGS. 1a–1d.
Figure 3:
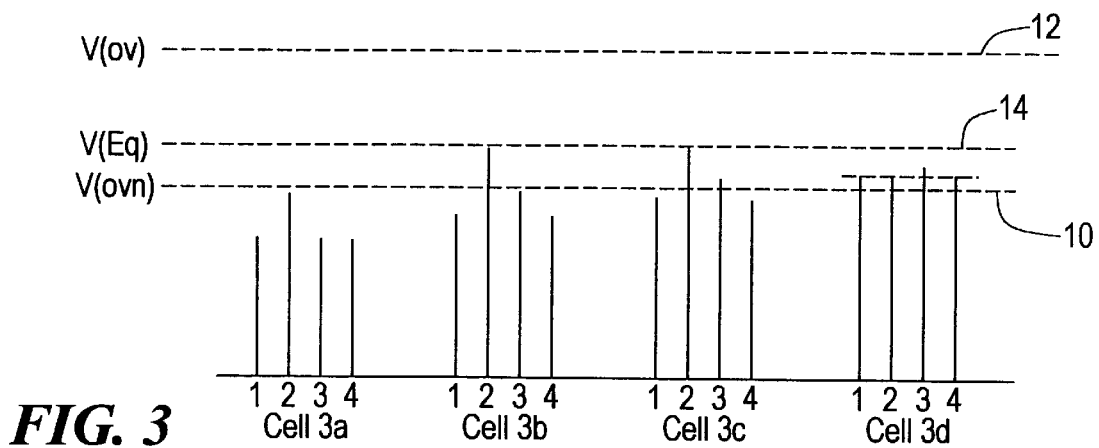
FIG. 3a–3d shows pack cell voltage during a charge cycle subsequent to that of FIGS. 2a–2d.

FIGS. 2a–2d shows the next successive charge cycle for the pack shown in FIG. 1. Cell 3 has the highest voltage, and hence is the first to approach V(eq) in FIG. 2b. As cell 3 crosses V(eq), in FIG. 2c, cell selection logic chooses cell 1 as the reference cell. Cell 3 is then discharged down to the level of cell 1, also the level of previous balance cell 4, as shown by dotted line 34.

A third charge cycle, shown in FIGS. 3a–3d, balances the pack. Cell 2 maintains the highest voltage, and hence approaches V(eq) first, as shown in FIG. 3b. FIG. 3c shows cell 2 crossing V(eq), and initiation of cell balancing 42 between cell 2 and cell 4. FIG. 3d shows a balanced pack as all cells are between V(eq) 14 and V(ovn) 10. The next charge would not trigger a cell balancing cycle because no cell would be below V(ovn) when the cell with the greatest voltage, cell 3, crosses V(eq). Subsequent charge/discharge cycles, however, might cause the cells to fall out of balance and trigger further charge balancing cycles.

Figure 4:
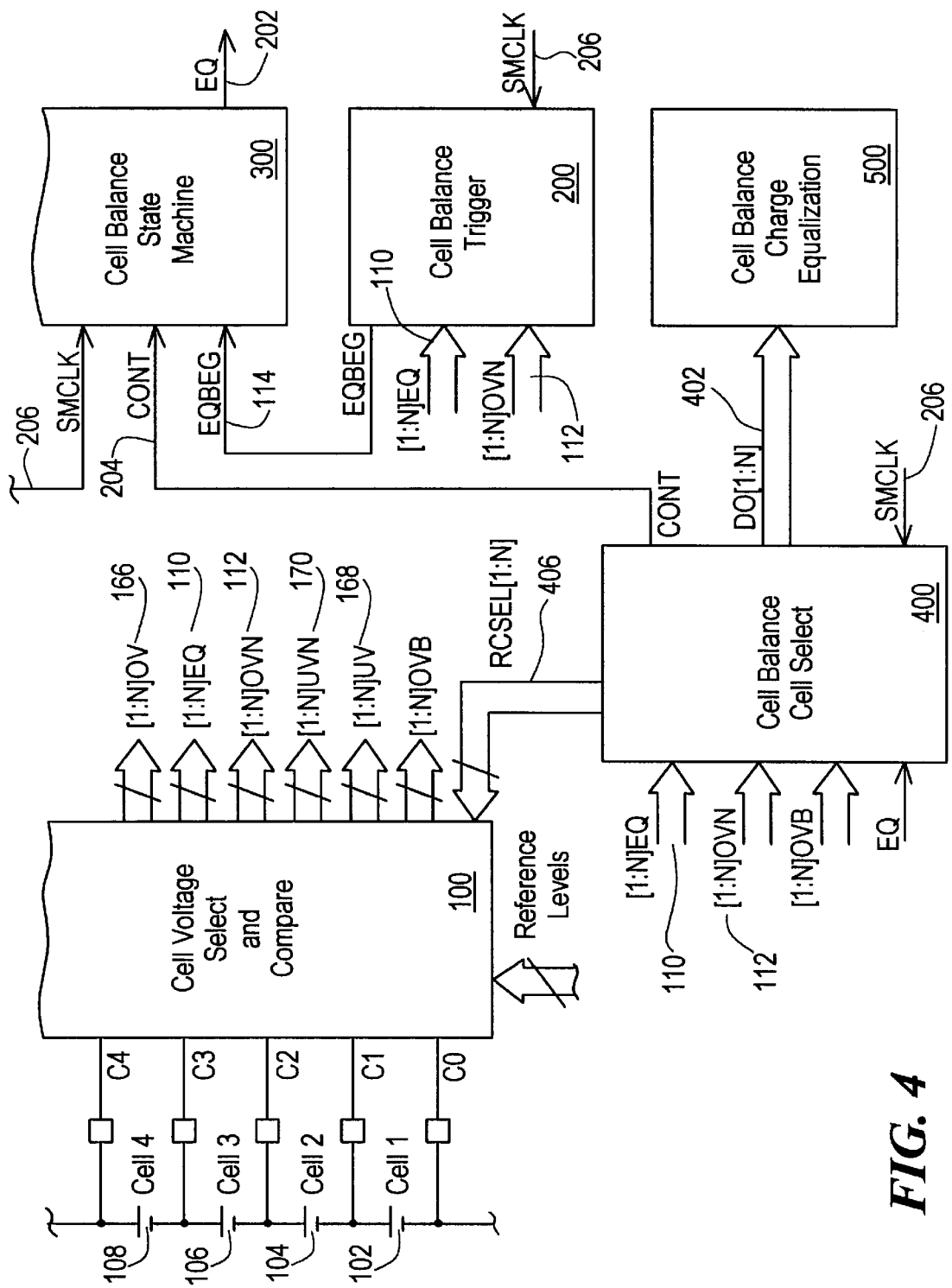
FIG. 4 is a block diagram of the charge balancing circuit according to the present invention.

Referring to FIG. 4, a block diagram of the charge balancing circuit as described herein is shown. Cell voltage select and compare circuit 100 samples voltage from each of the cells 102, 104, 106, and 108. The charge balancing circuit uses signals EQ 110, shown as [1:N]EQ to illustrate an EQ signal for each of 1-N cells in the pack, corresponding to the V(eq) 14 threshold, and OVN 112, corresponding to the V(ovn) 10 threshold, also where N is the number of cells in the pack. A given signal is asserted when the cell concerned is above the threshold voltage value. For example, 2EQ would be asserted when cell 2 is above the V(eq) threshold.

The cell balance trigger 200 monitors the equalization signals 110 and overvoltage-to-normal V(ovn) signals 112 to determine when charge balancing should be enabled. Cell balancing cannot be enabled until all cells are below V(ovn), indicated by all lines of OVN 112 being unasserted, which occurs during the course of a normal discharge. Cell balancing is then initiated when one of the EQ 110 lines is asserted, indicating that some cell has crossed the V(eq) threshold, while at least one OVN 112 line is still deasserted, indicating that at least one cell has not yet crossed the V(ovn) threshold, by asserting the EQBEG signal to the cell balance state machine.

Figure 7:
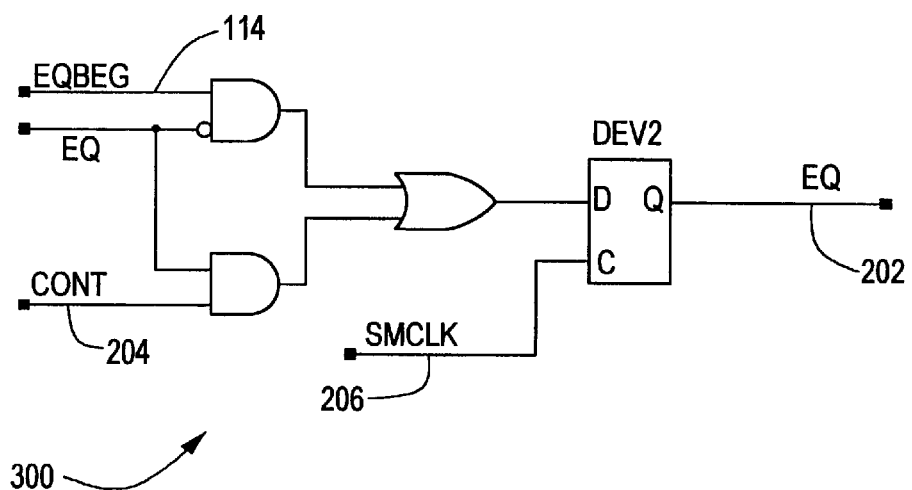
FIG. 7 is a schematic of the cell balance state machine of FIG. 4.

Cell balance state machine 300, comprises a flip flop and logic gates in a first embodiment shown in FIG. 7. Upon assertion of the EQBEG signal 114, indicating enabling of charge balancing, signals EQ 202 and CONT 204 are asserted at the next clock signal 206. The CONT 204 signal, described further below, is a continue signal which indicates that charge balancing may continue to occur. EQ 202 remains asserted until CONT 204 is deasserted to insure that charge balancing completes and also to guard against improper initiation of charge balancing, such as when all cells are above V(ovn) 10.

The cell balance cell select circuit 400 receives the results of the cell voltage comparisons from the cell voltage select and compare circuit 100 through the EQ 110 and OVN 112 signals to determine the balance and reference cells. The balance cell is determined by the first cell to cross V(eq) 14. If multiple cells have crossed V(eq), one is selected by a prioritization circuit.

Another prioritization circuit, described below, will determine a reference cell if multiple cells remain below V(ovn). The cell balance cell select circuit 400 outputs Do 402, also enumerated for each of cells 1-N, which indicates the balance cell and also directs the cell balance charge equalization circuit to bring the voltage level of the balance cell down to the voltage level of reference cell. The CONT 204 signal is also output to maintain charge balancing until the balance cell and reference cell have equal voltages.

Cell balance charge equalization circuit 500 modifies the charge of the balance and reference cells. This circuit modifies the selected balance cell and reference cell until equal in charge, at which time the CONT 204 signal will be deasserted, completing charge balancing. As indicated above, however, alternative embodiments may maintain the charge of the balance cell while continuing to charge the reference cell, or to both discharge the balance cell and charge the reference cell until the voltage is equal.

Figure 5A:
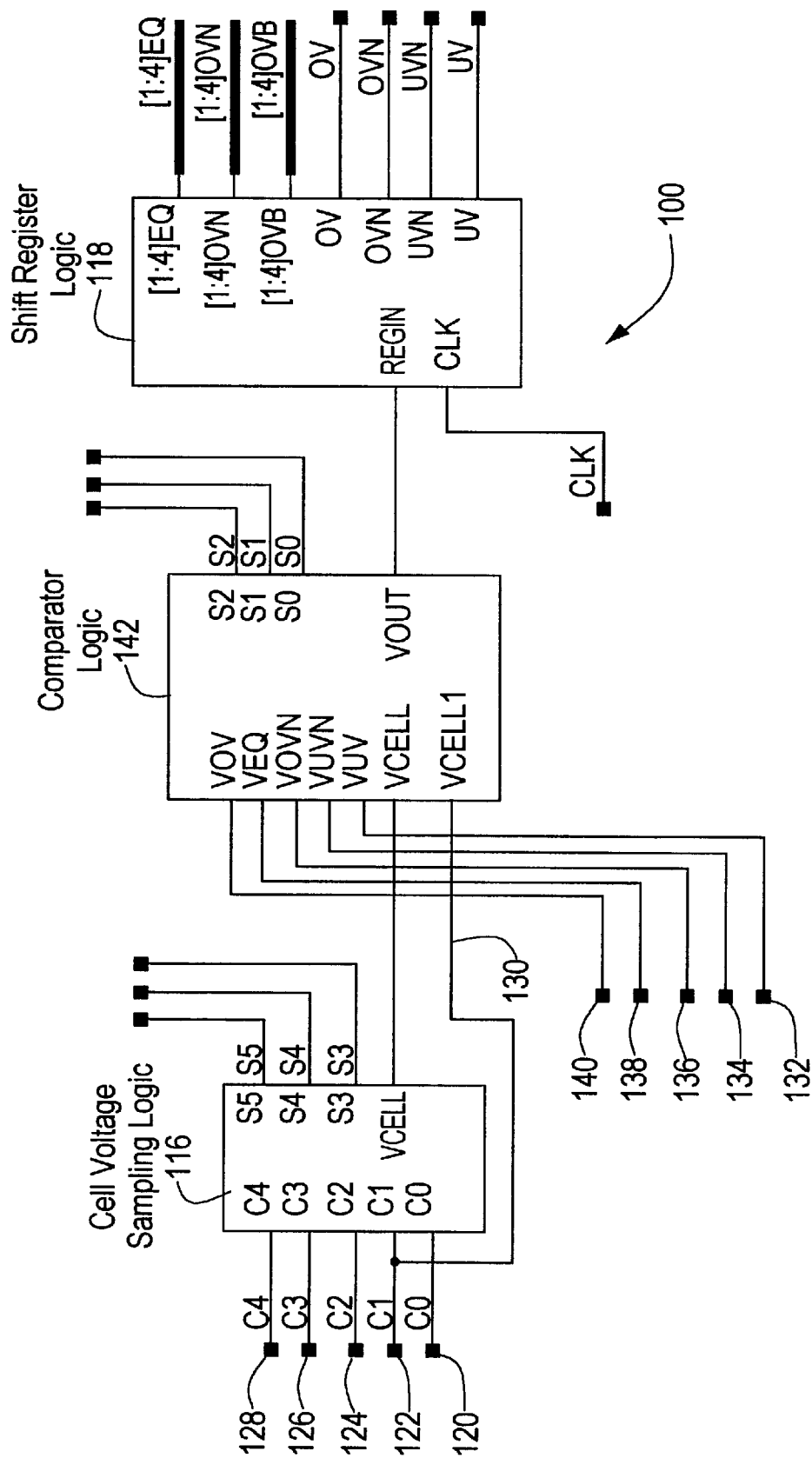
FIG. 5a is a block diagram of the cell balance select and compare circuit of FIG. 4.

Referring to FIG. 5a, a first embodiment of the cell voltage select and compare circuit 100 of FIG. 1 is shown in more detail. This circuit is generally responsible for sampling the voltage level of each of the cells and comparing this level to the voltage thresholds which determine the charging range. Cell voltage select and compare circuit 100 includes cell voltage sampling logic 116 (FIG. 5b), comparator logic 142 (FIG. 5c), and shift register logic 118 (FIG. 5d).

This first embodiment implements cell selection logic which selects cell 1 as the reference cell, however cell selection logic can select a reference cell according to a variety of prioritization methods. Cell selection logic which consistently uses a specific cell results in simpler circuitry, is easier to implement, and results in a similar degree of balancing accuracy as long as the selected reference cell is not deficient in its ability to store a charge. Further, since cell 1 is favored as a reference cell, it will be selected irrespective of whether it has crossed the V(ovn) threshold.

While use of a consistent cell as the reference cell simplifies design and construction, it is possible that this cell will attain a charge equal to V(eq) first, and hence be picked as the balance cell. Since the same cell cannot be both a balance cell and a reference cell in the same charge cycle, an alternative cell would be selected from among the cells which had not yet crossed the V(ovn) threshold.

Voltage input terminals 120, 122, 124, 126, and 128 are connected between the terminals of the series-connected cells 1–4 (102, 104, 106, and 108 of FIG. 4) and indicate the respective voltage values. Reference voltage signal 130 is connected to cell 1 at terminal 122 to obtain the voltage of cell 1 for consistent use as the cell balance reference voltage, however another method of obtaining a reference voltage value could be employed, as indicated above. Pack voltage threshold values, determined by the physical constraints of the cells of the pack, are input at terminals 132, 134, 136, 138, and 140. Undervoltage 132 indicates the minimum voltage allowable for a cell. Overvoltage 140 indicates the maximum allowable voltage value for a cell. Over-voltage-to-normal threshold V(ovn) 136 is slightly below the overvoltage threshold, and is used to set a protection circuit state machine to provide hysteresis in transitioning between various states in the charge cycle. An under-voltage-to-normal threshold V(uvn) 132 is slightly above the under-voltage threshold, and is likewise used to set a state machine, Equalization voltage 138 indicates the voltage value where charge balancing will be initiated between the cell reaching the equalization voltage and a cell which has not yet attained an overvoltage-to-normal charge.

Figure 5B:
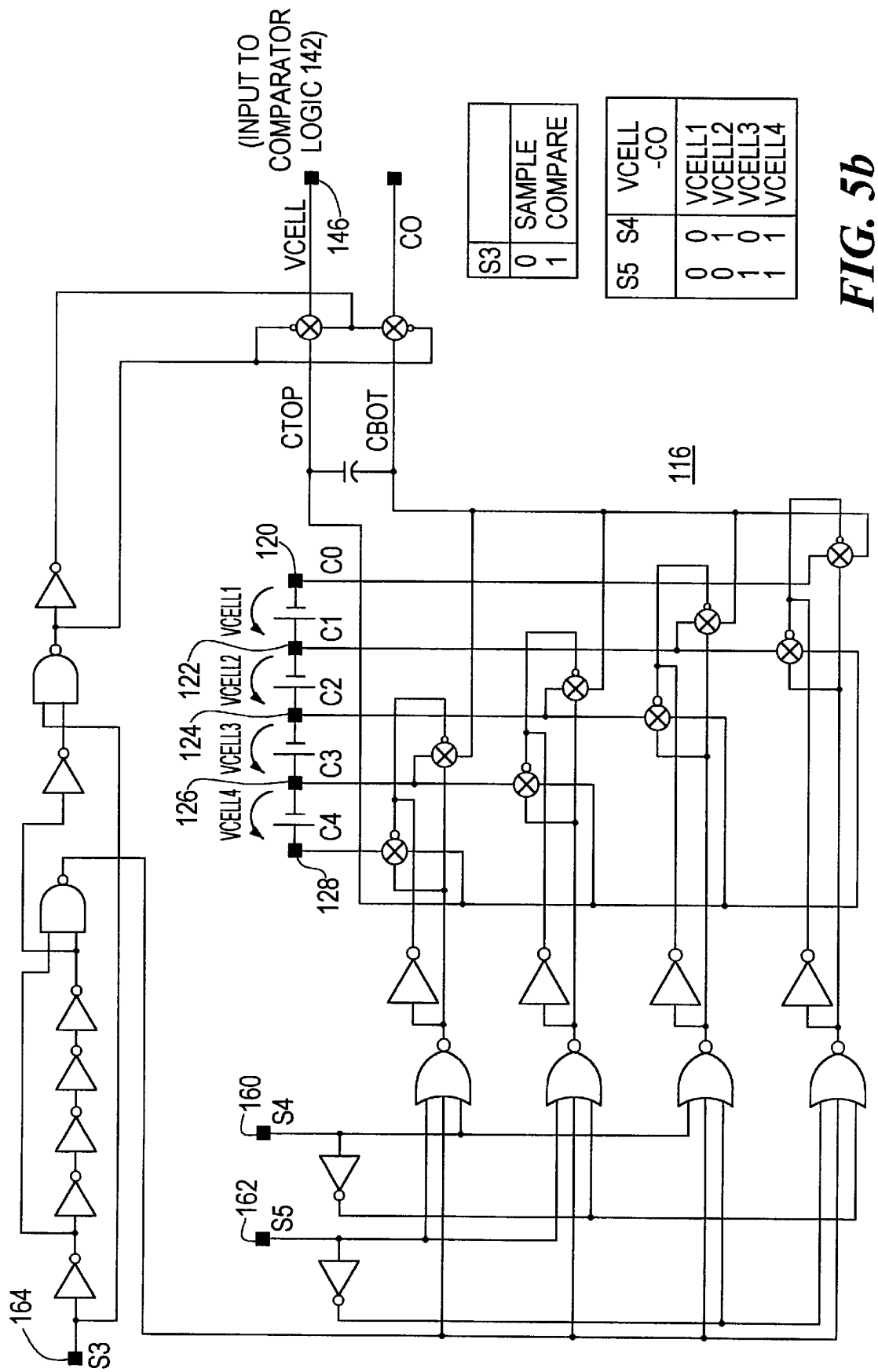

FIG. 5b shows cell voltage sampling logic 116 which uses a capacitor to sample and level shift the voltage values to accurately read a single cell. Since the cells are connected in series, a voltage reading relative to ground indicates the aggregate voltage of all cells between the sampling point and ground. For this reason, a voltage reading must be taken between each cell in series to obtain individual voltage values for each cell. Cell selection inputs 160, 162 are used to select the cell to be sampled, while input 164 switches output 146 to be provided to comparator logic 142. The result is a level shifted value indicating the voltage level of only the selected cell, not the voltage of the selected cell and all other intervening cells.

Figure 5C:
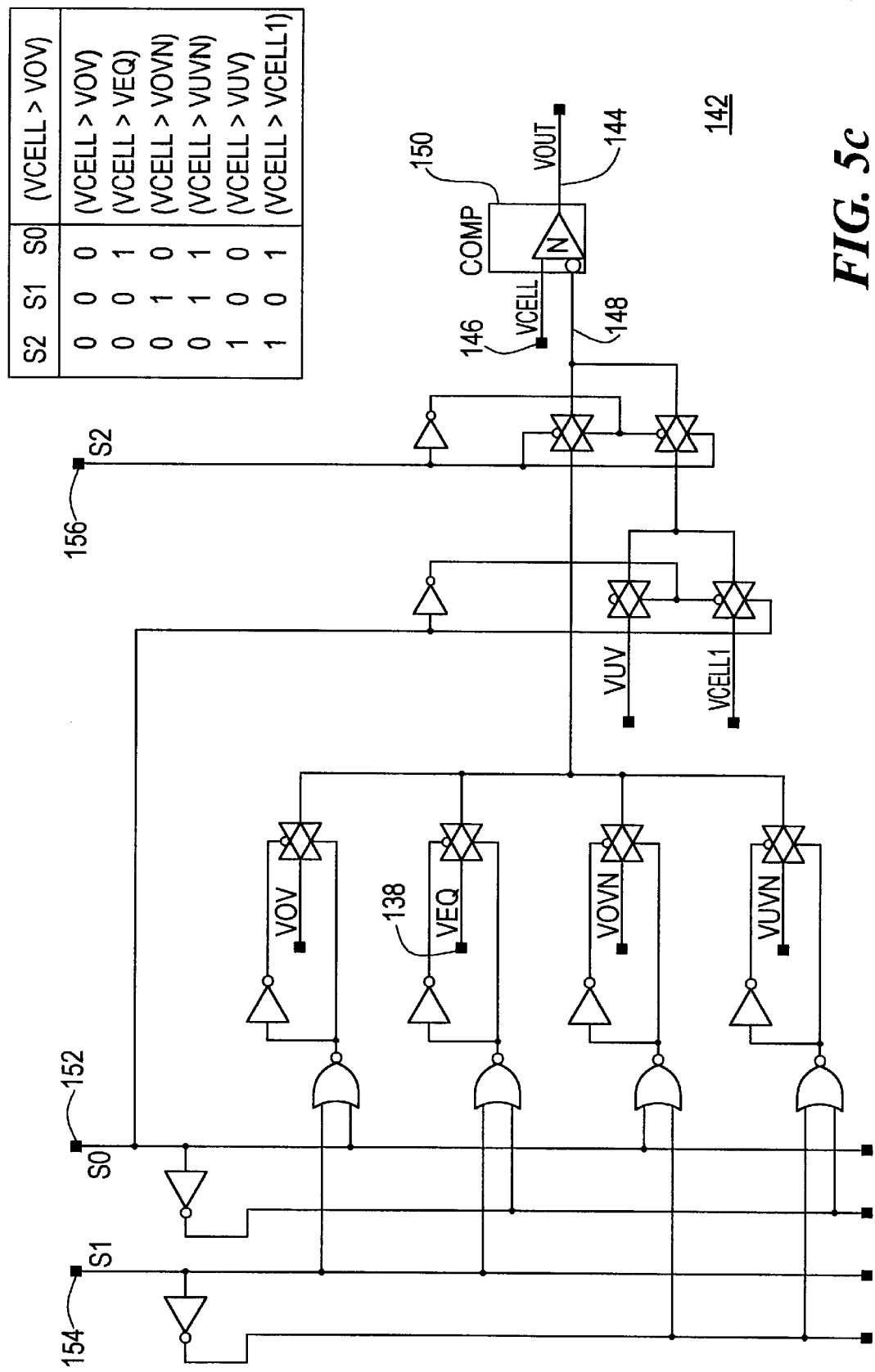
Figure 5D:
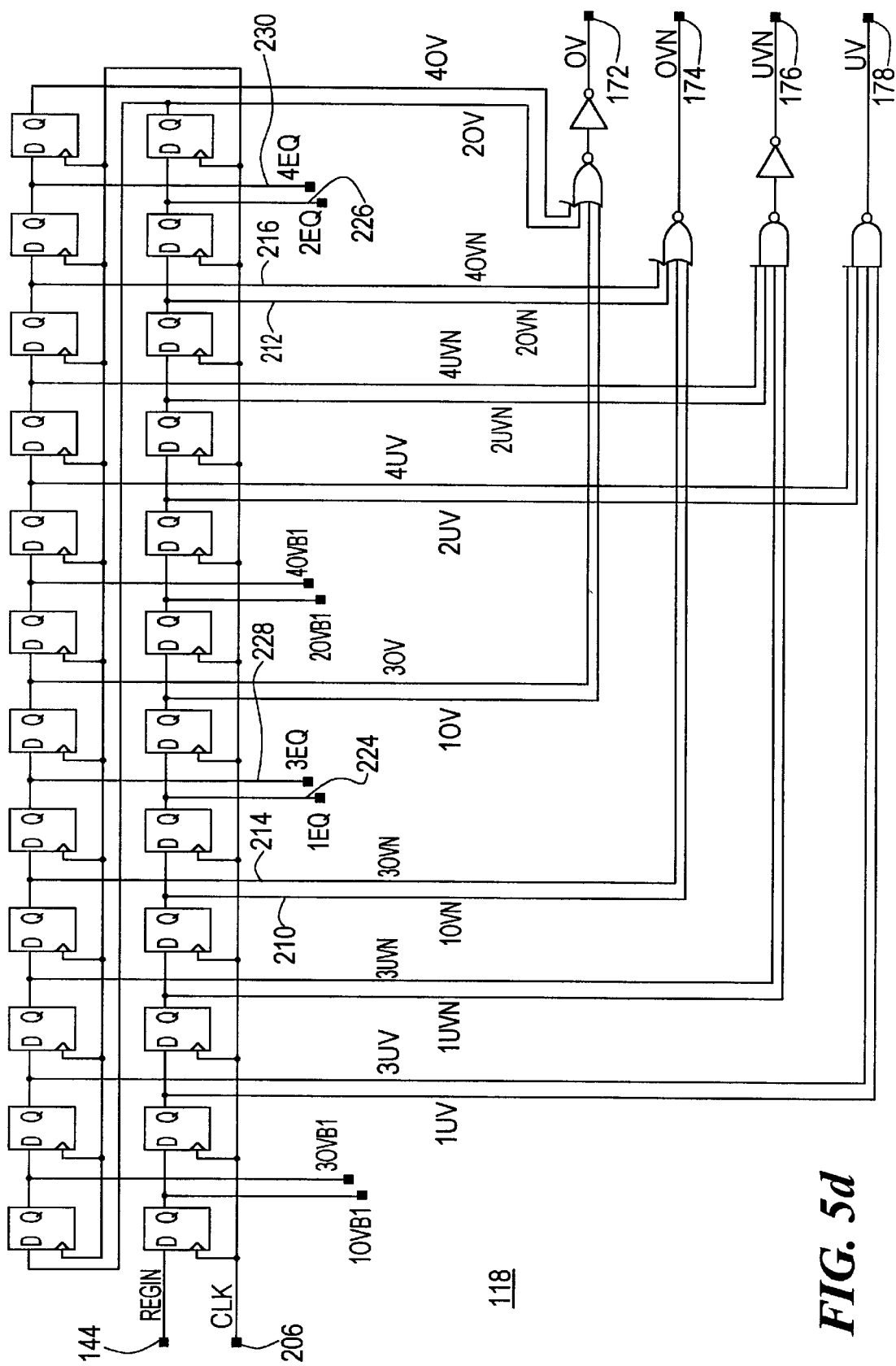

As shown in FIG. 5c, the comparator logic 142 of cell voltage select and compare circuit 100 accepts the sampled voltage values and outputs a comparator result signal 144, which is indicative of comparisons of the various voltage thresholds, using a single comparator 150. By deasserting voltage threshold selection high bit input 154, deasserting comparator voltage selector 156 and asserting voltage threshold selection low bit input 152, comparator reference voltage 148 will be set to the equalization voltage 138 and comparator result signal 144 will indicate if the sampled cell voltage 146 is greater than the reference voltage 138.

Shift register 118 of the cell voltage select and compare circuit 100, shown more fully in FIG. 5d, accumulates the results of voltage comparisons performed by comparator logic 142. The results of the periodic sampling and comparisons taken each clock signal 206 are stored for use by cell balance trigger 200 and cell balance cell select 400 circuits. For each of the four cells in this embodiment, the overvoltage OV 166, undervoltage UV 168, undervoltage-to-normal UVN 170, overvoltage-to-normal OVN 112, equalization voltage EQ 110, and cell-to-reference cell voltage comparison results are stored. Aggregate signals for all cells OV 172, OVN 174, UVN 176, and UV 178 are also provided at the respective terminals, as the logic indicates.

Figure 6:
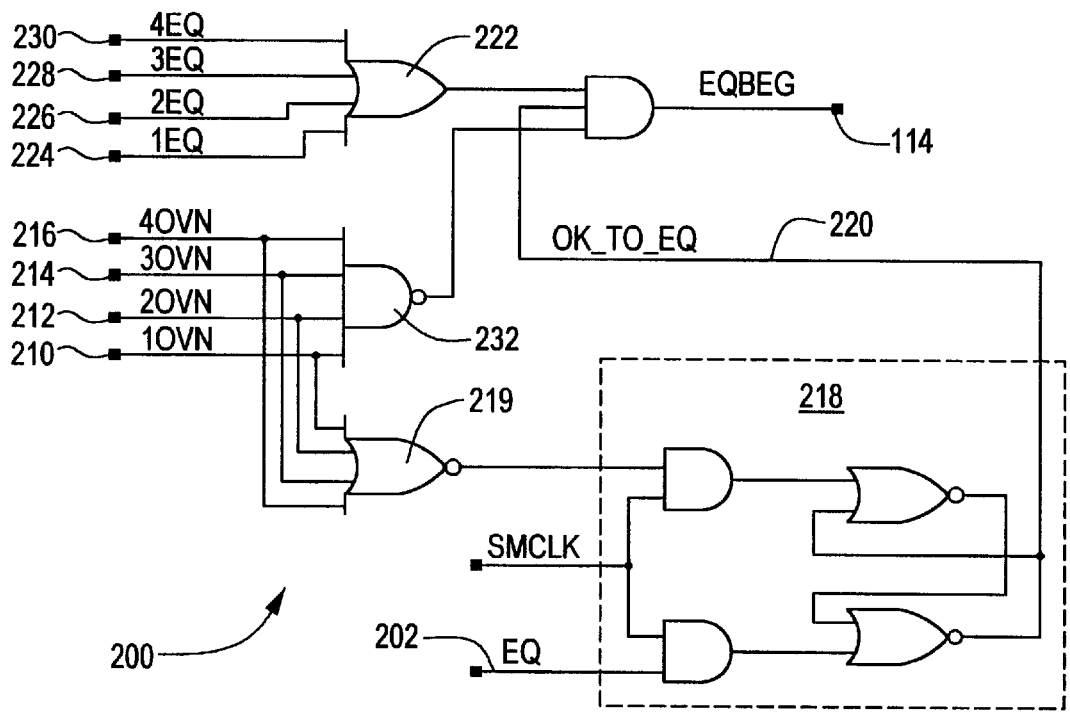
FIG. 6 is a schematic of the cell balance trigger circuit of FIG. 4.

Cell balance trigger 200, shown in FIG. 6, monitors the equalization voltage signals EQ 110 and overvoltage-to-normal signals OVN 112. The equalization threshold is slightly higher than the overvoltage-to-normal threshold; in the preferred embodiment a 50 mV differential is a desirable value. When all cells have fallen below the overvoltage-to-normal threshold, as indicated by NOR gate 219 and all lines of OVN 210, 212, 214, 216 being unasserted, the next clock signal 206 will result in equalization latch 218 being set and asserting OK_TO_EQ signal 220. When the cell balance trigger circuit detects that a cell has crossed the equalization threshold, as determined by OR gate 222 and any lines of EQ 224, 226, 228, and 230 being asserted, and also that at least one cell is still below the overvoltage-to-normal threshold as determined by gate 232, EQBEG signal 114 is asserted to indicate that the charge balancing cycle can begin.

When EQBEG signal 114 is asserted, cell balance state machine 300, shown in FIG. 7, enters the charge balancing state the following clock 206 cycle. The cell balance state machine 300 then sets and holds EQ (equalization) signal 202 until CONT (continue) signal 204 is deasserted by cell balance cell select circuit 400.

Figure 8:
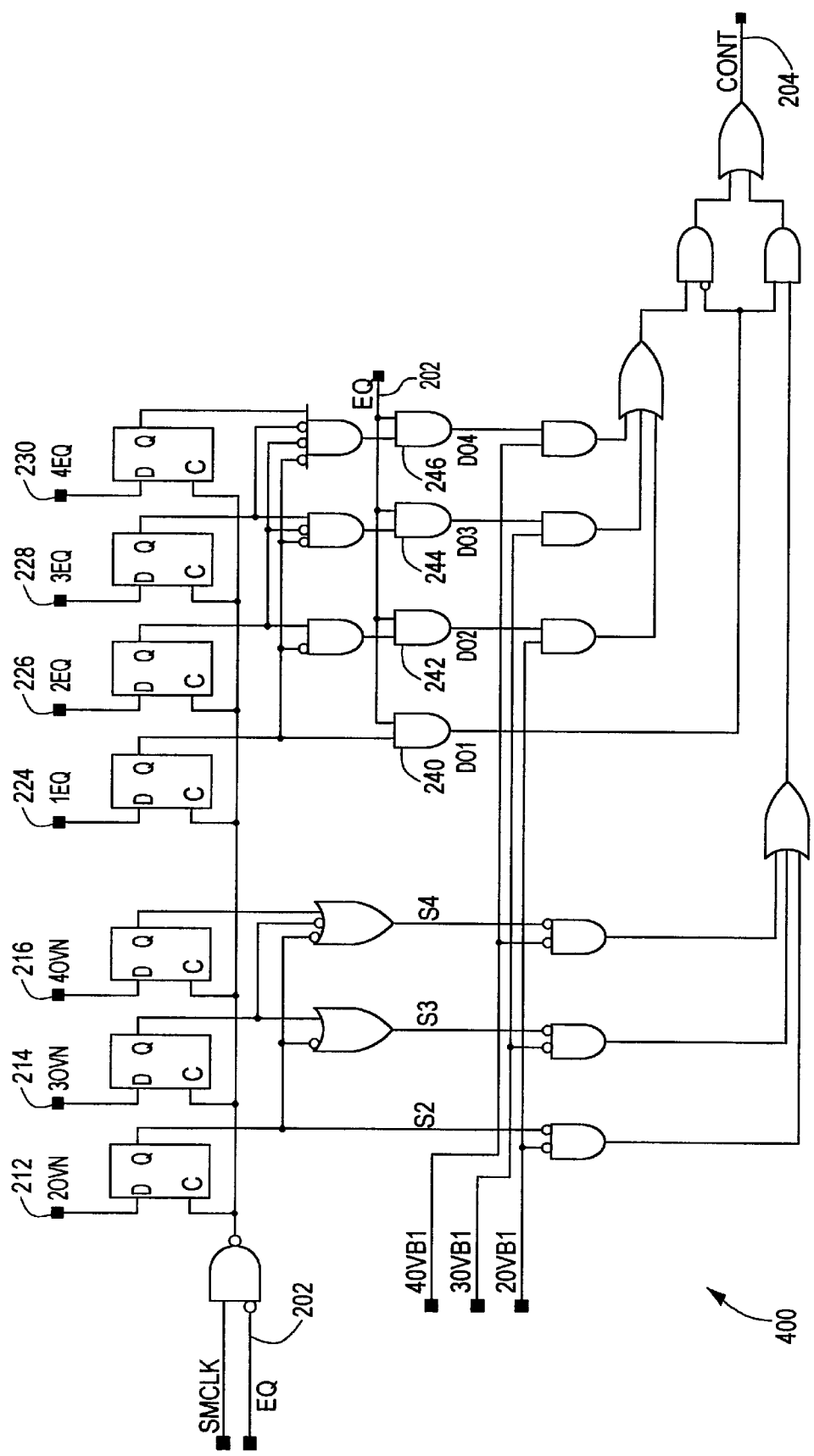
FIG. 8 is a schematic of one embodiment of the cell balance cell selection circuit of FIG. 4.

Referring to FIG. 8, cell balance cell select 400 identifies the balance cell and the reference cell. Overvoltage-to-normal signals 212, 214, 216 and equalization signals 224, 226, 228, 230 are provided to determine the balance cell. Balance cell signal 402, from FIG. 4, is output to cell balance charge equalization circuit 500 on one of cell balance lines 240, 242, 244, 246, identifying one of the four cells, respectively, as the balance cell. In the preferred embodiment cell 1 is chosen as the reference cell, as indicated above, hence 1OVN 210 need not be provided. In other embodiments, alternative reference cell prioritization logic is employed to select any cell which has not crossed the overvoltage-to-normal threshold as the reference cell. Equalization continues until the voltage levels of the balance cell and the reference cells are equal, at which point the CONT signal 204 is deasserted and charge balancing stops.

Figure 9B:
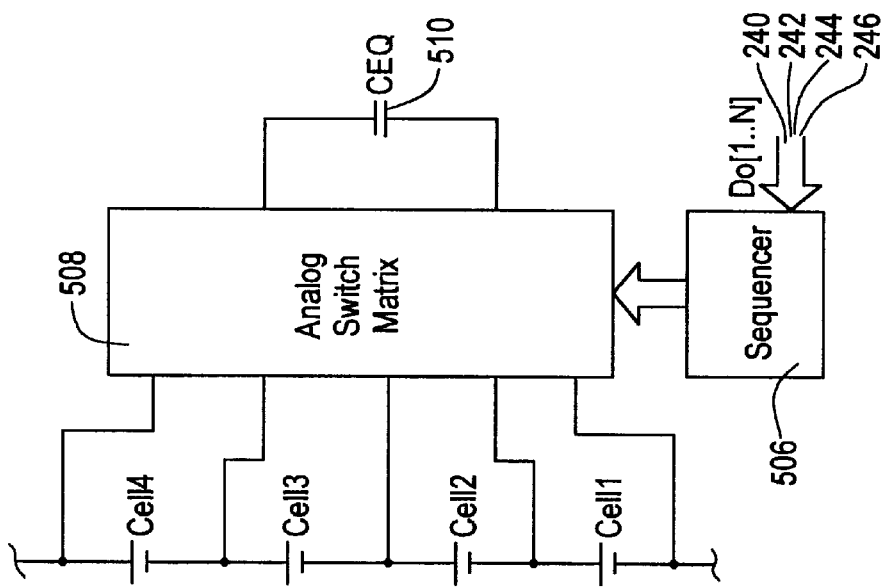
FIGS. 9a and 9b are a schematic of alternate embodiments of the cell balance charge equalization circuit of FIG. 4.
Figure 9A:
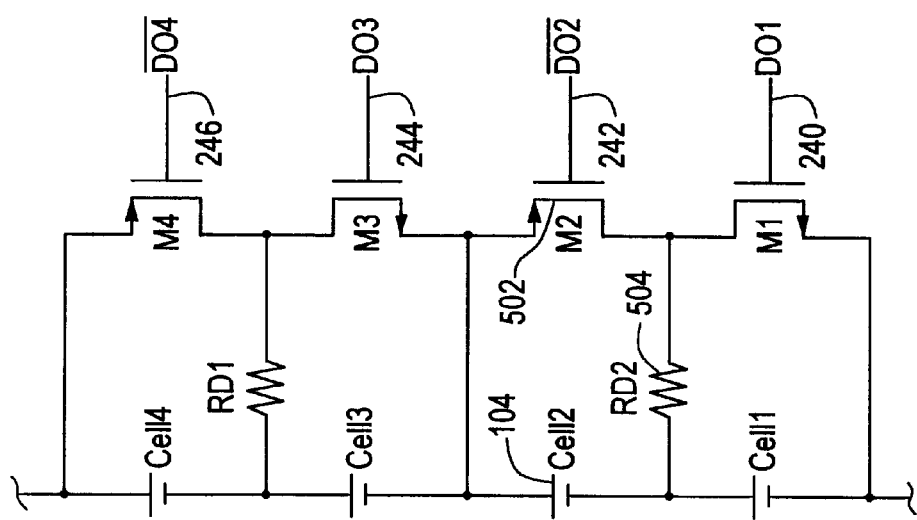

Referring to FIGS. 9a and 9b, two embodiments of the cell balance charge equalization circuit 500 are shown. This circuit modifies the charge of the balance and reference cells. Referring to FIG. 9a, if cell 2 104 is selected as the balance cell, Do2 242 is asserted, and FET switch 502 is turned on, connecting resistor 504 across cell 2 104 and causing a circulating current to flow through only cell 2, resulting in a discharge. The current must be sufficient to discharge the balance cell 2 104 down to the level of the reference cell in a reasonable amount of time. About 200 mA is sufficient to discharge a 1.2 AHr lithium-ion cell by 50 mV in about 30 minutes.

FIG. 9b shows a second embodiment of the cell balance charge equalization circuit 500. In this embodiment the cell balance lines 240, 242, 244, 246 are connected to a sequencer 506 which controls a switch matrix 508. A capacitor 510 is then used to ferry charge around the cell pack by either of several arrangements. One arrangement is to connect the capacitor 510 across the balance cell and then across the reference cell. Alternatively, the capacitor could be connected to the balance cell and shorted to ground, or the capacitor could be connected across the entire pack and then across the reference cell. Other arrangements can be used, as long as switch matrix 508 switches the cells in some manner such that the charge of either or both the balance cells and reference cells are modified to cause the voltage levels of the cells to eventually become equal. Alternatively, in the above embodiment which favors cell 1 as the reference cell, the balance cell may be discharged charged slightly below the voltage level of the reference cell to avoid the same pair of cells consistently being chosen as the balance/reference pair.

As various alternatives and modifications to the preferred embodiment disclosed above may be apparent to those skilled in the art, the invention as disclosed herein is not intended to be limited except by the spirit and scope of the following claims.

What is claimed is:

1. A multi-cell battery pack charge balancing circuit comprising:

a cell voltage comparison subcircuit for connection to a plurality of rechargeable cells, said cell voltage comparison subcircuit having a first voltage threshold and a second voltage threshold and producing cell voltage output signals indicative of a voltage associated with each of said cells exceeding said first voltage threshold and said second voltage threshold;

a charge balance trigger connected to said cell voltage comparison subcircuit and operative to receive said cell voltage output signals and to generate a balance signal in response thereto, wherein said balance signal is indicative of the voltage level of at least one of said plurality of cells exceeding said first voltage threshold and at least another of said plurality of cells not exceeding said second voltage threshold;

cell balance selection logic connected to said cell voltage comparison subcircuit and to said charge balance trigger, and operative to identify a balance cell and a reference cell from among said plurality of rechargeable cells in response to said balance signal, wherein a voltage level of said balance cell exceeds said first voltage threshold, and a voltage level of said reference cell does not exceed said second voltage threshold; and a charge switching subcircuit connected to each of said cells and adapted to electrically connect said balance and said reference cells such that the voltage level of each becomes equal.

2. The charge balancing circuit of claim 1 wherein said cell voltage comparison subcircuit produces said cell voltage output signals in response to comparing the differential obtained by coupling individual ones of said plurality of rechargeable cells relative to a ground.

3. The charge balancing circuit of claim 1 wherein said charge switching subcircuit is further connected to said cell balance selection logic and operative to switch each of said cells to a charging source and to a discharge source, wherein said charge switching subcircuit selectively couples said balance and said reference cells such that their voltage levels are made equal.

4. The charge balancing circuit of claim 3 wherein said charge switching subcircuit couples said balance cell to said discharge source.

5. The charge balancing circuit of claim 4 wherein said charge switching subcircuit uncouples said balance cell from said charging source.

6. The charge balance circuit of claim 1 wherein said cell balance selection logic is adapted to select the cell having the greatest voltage as the balance cell.

7. The charge balance circuit of claim 1 wherein said cell balance selection logic is adapted to select the cell to first attain said first voltage threshold as the balance cell.

8. The charge balance circuit of claim 1 wherein said cell balance selection logic is adapted to select the cell with the least voltage as the reference cell.

9. The charge balance circuit of claim 1 wherein said cell balance selection logic is adapted to select a predetermined cell as the reference cell.

10. The charge balance circuit of claim 1 wherein said charge balance trigger continues to assert said balance signal to said cell balance selection logic until said balance cell and said reference cell have equal voltages.

11. The charge balance circuit of claim 1 wherein said charge balance trigger is asserted:
   after a period when said voltage level of all cells is lower than said second threshold, and
   said voltage level of at least one cell is above said first threshold.

12. The charge balance circuit of claim 1 wherein said cell voltage comparison subcircuit has only a single comparator connected to said cells to produce said cell voltage output signals.

13. The charge balance circuit of claim 1 wherein said second voltage threshold is about 4V.

14. The charge balance circuit of claim 13 wherein said first voltage threshold is about 50 mV above said second voltage threshold.

15. A method of balancing charge levels in a battery pack having a plurality of individual cells comprising the steps of:
   sampling the voltage levels of each of said individual cells;
   comparing the sampled voltage to a first voltage threshold for each cell;
   comparing the sampled voltage to a second voltage threshold for each cell;
   enabling a balance state if the voltage level of at least one cell is above said first voltage threshold and the voltage level of at least one cell is below said second voltage threshold;
   selecting, if said balance state is enabled, a balancing pair of cells comprising a first cell having a voltage level above said first voltage level and a second cell having a voltage level below the voltage level of said first cell;
   modifying the voltage level of at least one cell of said balancing pair until the voltage levels of the balancing pair are substantially equal.

16. The method of balancing charge levels according to claim 15 wherein said step of modifying further comprises the step of decoupling said first cell from a charging source.

17. The method of balancing charge levels according to claim 16 wherein said step of modifying further comprises the step of coupling said first cell to a discharge source.

18. The method of balancing charge levels according to claim 15 wherein said step of selecting of said first cell comprises selecting the cell with the greatest charge.

19. The method of balancing charge levels according to claim 15 wherein said step of selecting of said first cell comprises selecting the first cell to reach said first voltage threshold.

20. The method of balancing charge levels according to claim 15 wherein said step of selecting of said second cell comprises selecting a cell below said second voltage level.

21. The method of balancing charge levels according to claim 15 wherein said step of selecting of said second cell comprises selecting a cell with the lowest charge.

22. The method of balancing charge levels according to claim 15 wherein said step of selecting of said second cell comprises selecting a predetermined cell.

23. The method of balancing charge levels according to claim 15 wherein entering said balance state does not occur if all cells have not fallen below said second threshold since the previous balance state.

24. The method of balancing charge levels according to claim 15 wherein said step of sampling includes switching each cell to be sampled to a single comparator for each of said first voltage threshold and said second voltage threshold.

25. The method of balancing charge levels according to claim 15 wherein said step of sampling further comprises comparing the voltage levels of individual ones of said plurality of cells relative to a ground.

* * * * *